US007664896B2

(12) United States Patent
Galloway

(10) Patent No.: US 7,664,896 B2
(45) Date of Patent: Feb. 16, 2010

(54) EXPEDITED COMPLETION DONE MESSAGES, METHOD AND APPARATUS

(75) Inventor: William C. Galloway, Houston, TX (US)

(73) Assignee: Pivot 3, Inc., Spring, TX (US)

(*) Notice: Subject to any disclaimer, the term of this patent is extended or adjusted under 35 U.S.C. 154(b) by 1451 days.

(21) Appl. No.: 10/396,969

(22) Filed: Mar. 26, 2003

(65) Prior Publication Data

US 2004/0193736 A1 Sep. 30, 2004

(51) Int. Cl.
*G06F 13/42* (2006.01)
*G06F 13/00* (2006.01)
*G06F 13/14* (2006.01)

(52) U.S. Cl. .................................. 710/105; 710/107
(58) Field of Classification Search .............. 710/1, 710/36, 100, 105–107
See application file for complete search history.

(56) References Cited

U.S. PATENT DOCUMENTS 5,249,184 A * 9/1993 Woest et al. ............... 370/402
5,469,545 A * 11/1995 Vanbuskirk et al. ........ 709/234

OTHER PUBLICATIONS

T10; "Working Draft American National Standard: Project T10/1562-D; Serial Attached SCSI (SAS)"; American National Standards Institute; Revision 3b; Jan. 26, 2003.*
American National Standard for Information Technology; "*Fibre Channel Protocol for SCSI*;" Apr. 8, 1996; pp. 1-63.
American National Standard for Information Technology; "*Fibre Channel—Arbitrated Loop (FC-AL)*;" Apr. 8, 1996; pp. 1-90.
American National Standard for Information Technology; *Fibre Channel Arbitrated Loop (FC-AL-2)*; Dec. 8, 1999; pp. 1-139.
American National Standard for Information Systems; "*Fibre Channel Physical and Signaling Interface (FC-PH) Rev 4.3*;" Working Draft, Jun. 1, 1994; pp. 1-32, 81-160, 205-223 & 230-258.
American National Standard for Information Technology; "*Fibre Channel—Physical and Signalling Interface-2 (FC-PH-2)*;" Mar. 12, 1997; pp. 1-4, 17-64, 78-80.
American National Standard for Information Technology; "*Fibre Channel—Physical and Signalling Itnerface-3 (FC-PH-3)*;" Apr. 3, 1998; pp. 1-3, 20-39 & 56-61.
American National Standard for Information Technology; "*Serial Attached SCSI (SAS)*;" Genuine Draft 11, Mar. 18, 2002; pp. 1-112.
Serial ATA Workgroup; "*High Speed Serialized AT Attachment*;" Revision 1.0, Aug. 29, 2001; pp. 1-306.
American National Standard for Information Technology; "*SCSI Parallel Interface-4 (SPI-4)*;" Working Draft, May 2, 2002, 8:11 am; pp. 1-51 & 189-207.

* cited by examiner

*Primary Examiner*—Ryan M Stiglic
(74) *Attorney, Agent, or Firm*—Wong, Cabello, Lutsch, Rutherford & Brucculeri LLP

(57) ABSTRACT

A method to provide more opportunities to close a connection in an orderly fashion and avoid abrupt break of the connection. A device and a system operable to practice such as method.

71 Claims, 11 Drawing Sheets

EXPEDITED COMPLETION DONE MESSAGES, METHOD AND APPARATUS

BACKGROUND OF THE INVENTION

1. Field of the Invention

This invention relates to computer mass storage devices, in particular, relates to Serial Attached SCSI (Small Computer System Interface) mass storage devices.

2. Description of the Related Art

Most computer systems have mass storage devices where software programs, raw data and outputs are stored on a permanent basis. There are many types of mass storage devices, for example, magnetic disk drives such as hard drives, or optical disk drives such as a CD-ROM or DVD. There are also many ways to access these various types of mass storage devices, i.e. the protocols or interfaces connecting between the host computers and the mass storage devices. One of the simplest ways of connecting between a host computer and a mass storage device is to connect the hard drives directly to the motherboard of the host computer. Most personal computers, such as desktop or laptop computers, have mass storage devices connected to the motherboard directly using an IDE (Integrated Drive Electronics) or ATA (AT Attachment) cable, as shown in FIG. 1. The ATA cable, e.g. cable 120 as shown in FIG. 1, has a very limited length and limited number of drives that can be attached, normally two. The width of the cable and its limited length has created packaging problems for the installation of a large number of disk drives, which problem is exacerbated if additional controllers and cables are added. If the need of the computer storage increases, that is the computer needs more storage, then either the disk has to be replaced with a larger hard drive, which has many problems, or an additional disk must be added, with at least the cabling problems discussed above.

The other leading alternative is SCSI (Small Computer System Interface). SCSI also uses a wide cable with limited lengths. However, SCSI can provide more disk drives for any given controller so the number of drives is not as limited. Again, the cable length and width creates problems.

Instead of having this one to one or one-to-few relationship between a hard drive and a computer, the computers and mass storage devices can have a multiple to multiple relationships through some intermediates. For example, a node computer can connect to a storage server through a network, for example Internet or local area network, as shown in FIG. 2. This storage server can have many hard drives or a disk farm including many different hard drives, DVDs or CD-ROMs. The storage server maintains the data integrity on various hard drives by keeping enough redundancy of the hard drives. The storage server can also manage the scalability of the capacity by adding or removing hard drives to increase or decrease the storage capacity of the disk farm. In the view of the node computer through the network, the storage server and the disk farms is just a large mass storage device. This aggregated and networked storage device arrangement is very reliable and flexible but it can be quite complicated and expensive.

In pursuit of better performance at a lower cost, a new type of interface between computer and mass storage device is being developed. One of such interconnections is called Serial Attached SCSI (SAS). The proposed SAS standard is compatible with the Serial ATA physical interconnect. The specifications can be obtained at the website serialata.org. The current specifications include Serial ATA, Revision 1.0a dated Jan. 7, 2003 and Serial ATA II: Extensions to Serial ATA 1.0, Revision 1.0, dated Oct. 16, 2002, both of which are hereby incorporated by reference. The SAS standard includes three types of protocols: Serial SCSI protocol (SSP), Serial ATA Tunneling protocol (STP), and Serial Management Protocol (SMP). This new standard is developed to operate with the SCSI standard, normally used on large computers for direct attached storage.

A host computer is also called an initiator. The hard drive or an individual piece of mass storage is called a target. A target may be connected to an initiator directly as in FIG. 3, similar to the arrangement as in FIG. 1, or may be connected through an expander, as in FIG. 4. Each initiator may connect to one or more expanders and each expander can connect to a number of targets, as shown in FIG. 4. An expander is a type of switch such that each initiator can connect to a target through a pathway through the expander. The connection between initiators to expanders, and expanders to targets are through the interconnection circuits which are called phys. Each phy contains a transceiver which can transmit and receive data frames or commands at the same time. Each initiator, expander or target may have multiple phys, e.g. as shown in FIG. 5A or 5B. In case where an initiator phy is directly attached to a target phy, the pathway and the physical link are identical. As shown in FIG. 5A, the initiator phy 502 is linked to the target phy 504 directly, so the pathway and the physical link are the same. In this case, the initiator has only one phy 502 and the target only has one phy 504. The pathway is the physical route of a connection. In case where there are expander devices between an initiator phy and a target phy, the pathway consists of all the physical links required to route a frame or a command between the initiator phy and the target phy, as shown in FIG. 5B. The physical links may or may not be using the same physical link rate. A connection is a temporary association between an initiator port and a target port. During a connection, frames or commands from the initiator port are forwarded to the target port and similarly all frames from the target port are forwarded to the initiator port. If multiple potential pathways exist between the initiator ports and the target ports, multiple connections may be established by a port between the following: a) one initiator port to one of multiple target ports; b) one target port to one of multiple initiator ports; or c) one initiator port to one target port. Once a connection is established, the pathway used for the connection may not be changed (i.e., all the physical links that make up the pathway remain dedicated to the connection until it is closed.) Since each connection between an initiator port and a target port is a dedicated connection, at each time, a port can only connect to one other port.

As shown in FIG. 5B, initiator 504 may have two ports 507 and 517, each having phy 510 and 520, respectively. Phy 510 is linked to expander phy 562 and port 561, and phy 520 is linked to expander phy 566 and port 565. Target 515 has one port 527 and two phys 530 and 540, it being a wide port. Target 525 has one port 547 and one phy 550. The target phys 530, 540 are linked to expander phys 564, 568 in port 563 and target phy 550 is linked to expander phy 572 in port 571. Initiator phy 510 may have three pathways, one to each of the target phys 530, 540 and 550. For example, the first pathway is from phy 510 to phy 562 on the expander to phy 564 on the expander to target phy 530; the second pathway is from phy 510 to phy 562 on the expander to phy 568 on the expander to target phy 540; the third pathway is from phy 510 to phy 562 on the expander to phy 572 on the expander to target phy 550. But at any given time, phy 510 can have only one pathway open, i.e. connecting to and communicating with one of the three target phys. Similarly, phy 520 may have a pathway to one of phys 530, 540 and 550, but phy 510 and 520 cannot simultaneously be connected to phys 530 and 540 as that would connect two ports 507 and 517 to one port 527.

An initiator can be connected to any one of the targets when needed with or without the intermediate expanders. The connection is only opened when there is a need to communicate from an initiator to a target. For example as shown in FIG. 5B, the initiator may have any one of the three connections to the three targets if the initiator needs to communicate with that one. When the need is satisfied, then the connection is closed. Therefore, there is a protocol to open and close the connections between initiators and targets.

A connection can be opened by sending an OPEN address frame from a source port to a destination port using one source phy and one destination phy. An AIP primitive is generated and sent by the intermediate expanders to indicate that the intermediate expanders are working to open up the connection, usually one segment at a time. The AIP indicates that the expander is waiting its turn to get the resources for opening the requested connection. If the OPEN address frame reaches the destination, the destination may return either OPEN_accept or OPEN_reject primitives. If the OPEN_accept primitive is received by the source port, then the connection is established between the source port and the destination port, as shown in FIG. 6. After that, data transmission can occur.

After the connection has been opened, each port can send frames to the other port. When either the source port or the destination port finishes transmitting frames, it can initiate the closure of the connection by sending a DONE primitive. Either port can send the first DONE. For simplicity of this discussion, it is assumed that the source port initiates the closure of the connection, but it is understood that the destination port could have initiated and the figures would be reversed.

There are several different ways to end a connection between the source port and the destination port. Some of those methods are more preferable than others. The least preferred method of closing a connection is breaking a connection. After transmitting a BREAK, the source port will ignore all incoming frames except for BREAKs. BREAKing a connection should be avoided because it is not an orderly closure between the two connected ports. The status of any outstanding commands is lost and lengthy recovery processes must occur. Using BREAK to close a connection is like using Ctrl+Alt+Del or unplugging the power cord to shut down a computer.

A preferred method of closing a connection is to send and receive DONE primitives between two connecting ports, as shown in FIG. 7. When all data transmission from the source port to the destination port is finished, the source port will send a DONE primitive to the destination port. The two ports will exchange DONE primitives and then CLOSE primitives to orderly close the connection between the source port and destination port. A CLOSE primitive is used to close a connection of any protocol. The CLOSE primitive is the last primitive exchanged between two ports before the connection is ended. If the connection between a source port and a destination port is closed through an orderly closure, the status of each port and all commands are known after the closure. So the next time the source port or the destination port is needed for other connection, the new connection can be started smoothly and immediately. But if the connection between the source port and the destination port is terminated by a BREAK primitive or some time out, then the status of the outstanding higher level commands may be unknown (although the status of the ports may be known). Before the higher level systems are recovered and reinitialized, those ports are not usable for data transmission.

If for any reasons, the two ports fail to exchange DONE primitives, then the CLOSE primitive cannot be used. Thereafter, the connection will be broken by a BREAK primitive or assumed to be broken.

It is desirable to have a method and an apparatus to reduce the chances of abrupt disconnection between a source port and a destination port. It is desirable to expand the availability of the DONE primitive for various situations when the DONE primitive is not currently available.

BRIEF SUMMARY OF THE INVENTION

The present invention uses new DONE primitives to initiate a closure of a connection under various conditions. The new DONE primitives can indicate additional information about why the connection is being closed and provide opportunities for the two connecting ports to close it in an orderly fashion.

BRIEF DESCRIPTION OF THE DRAWINGS

A better understanding of the invention can be had when the following detailed description of preferred embodiments is considered in conjunction with the following drawings in which.

DETAILED DESCRIPTION OF PREFERRED EMBODIMENTS

According to the embodiments of the present invention, more DONE primitives are defined such that DONE primitives are available in more situations. Table 1 lists some of the DONE primitives according to an embodiment of the present invention. Different DONE primitives are issued for different reasons. Such reason will inform the recipient of the DONE primitive the condition on the sender, the possible responses and the consequence of not responding within the predetermined time period.

TABLE 1

DONE primitives

| Primitive | Description |
|---|---|
| DONE (ACK/NAK TIME-OUT) | Timed out waiting for an ACK or NAK. The ACK/NAK count does not match the frame count. Transmitter is going to transmit BREAK when DONE time-out expires unless DONE is received prior to that |
| DONE (RESERVED TIME-OUT 0) Reserved. | Processed the same as DONE (ACK/NAK TIME-OUT). |
| DONE (RESERVED TIME-OUT 1) Reserved. | Processed the same as DONE (ACK/NAK TIME-OUT). |
| DONE (NORMAL) | Finished transmitting all frames. |
| DONE (RESERVED 0) Reserved. | Processed the same as DONE (NORMAL). |
| DONE (RESERVED 1) Reserved. | Processed the same as DONE (NORMAL). |
| DONE (CREDIT TIME-OUT) | Timed out waiting for an RRDY. |

DONE is exchanged prior to closing a connection. As it is understood by those skilled in the art, either the source port or destination can initiate the closure of a connection. For simplicity in the following discussion, it is assumed that the closure is initiated by the source port. A DONE can be initiated actively after finishing a certain task, or passively after being timed-out for a task. After a DONE primitive is sent, the source port starts a DONE-time-out timer. If the source port does not receive a response from the destination port within the DONE-time-out period, the source port will issue BREAK primitive to break the connection. If the source port does receive a response, then depending on the type of response, the source port may close the connection or keep the connection open.

Figure 1:
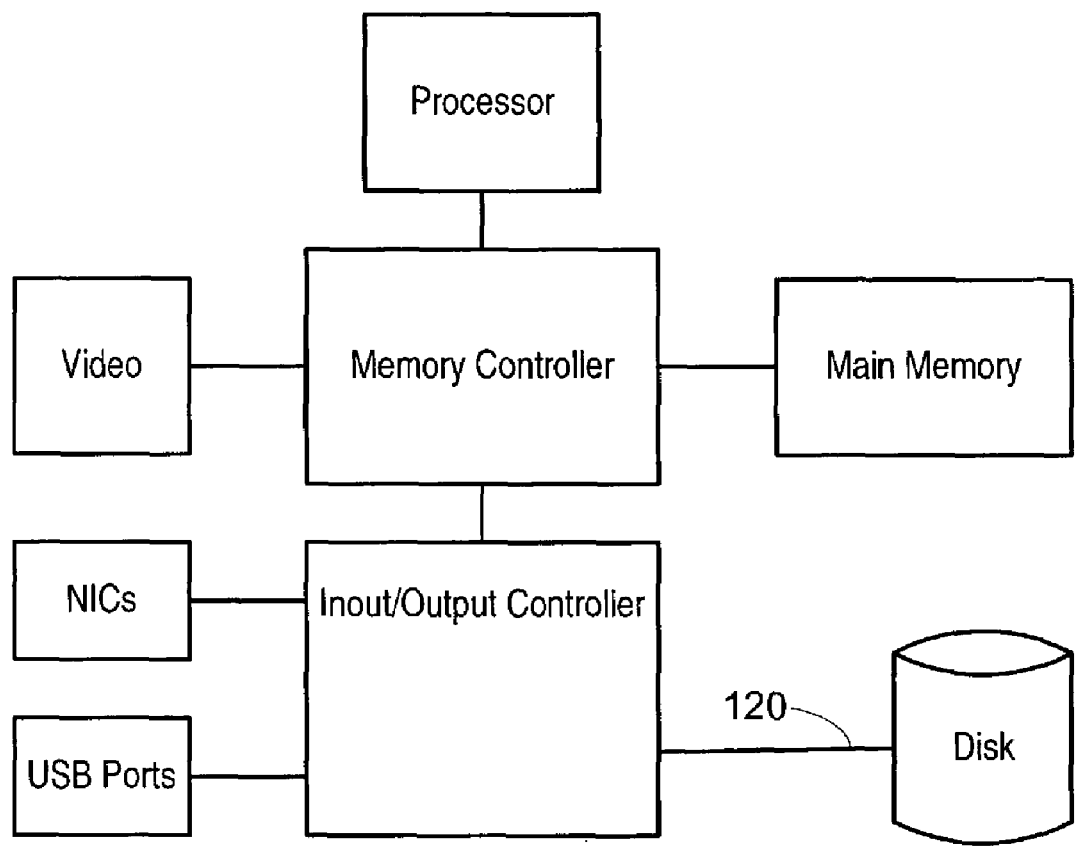
FIG. 1 depicts a computer and a hard drive using the ATA or SCSI interface.
Figure 2:
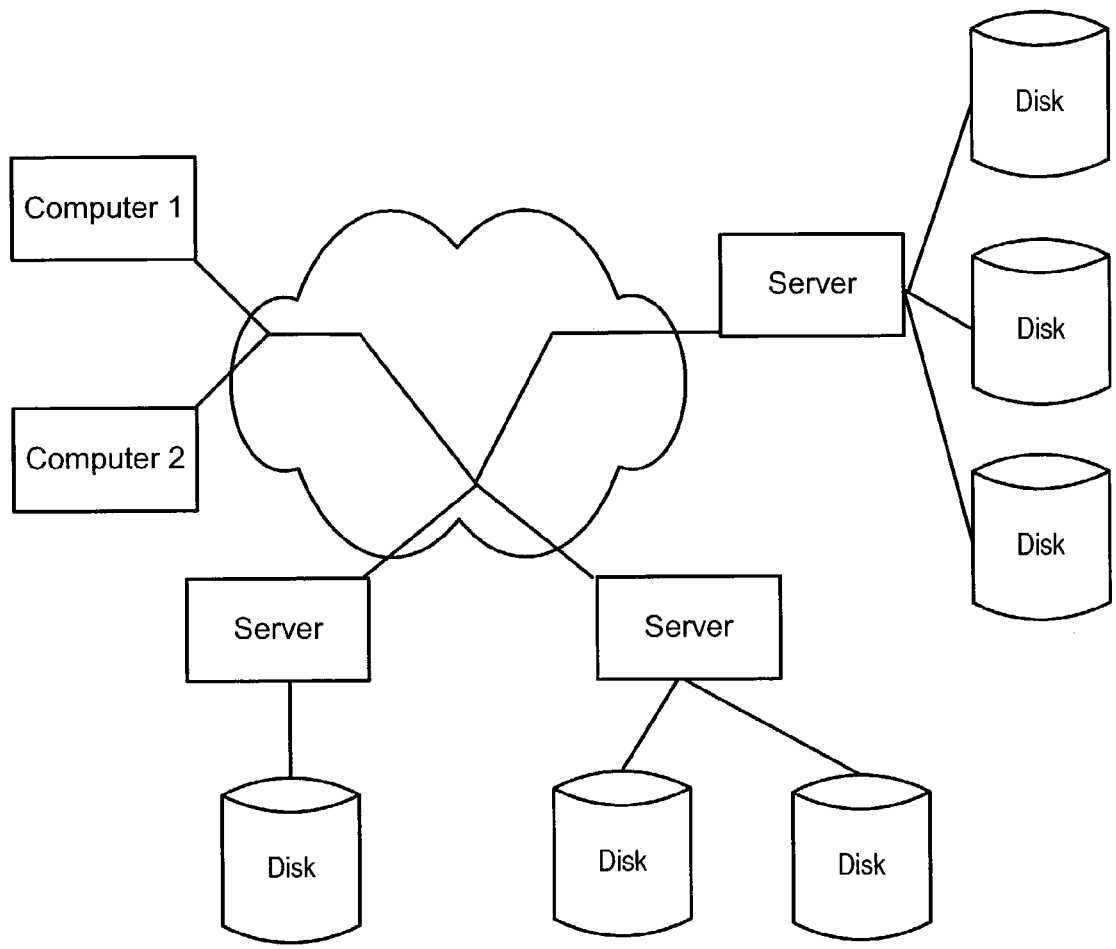
FIG. 2 depicts computers and mass storage devices connecting through a network.
Figure 3:
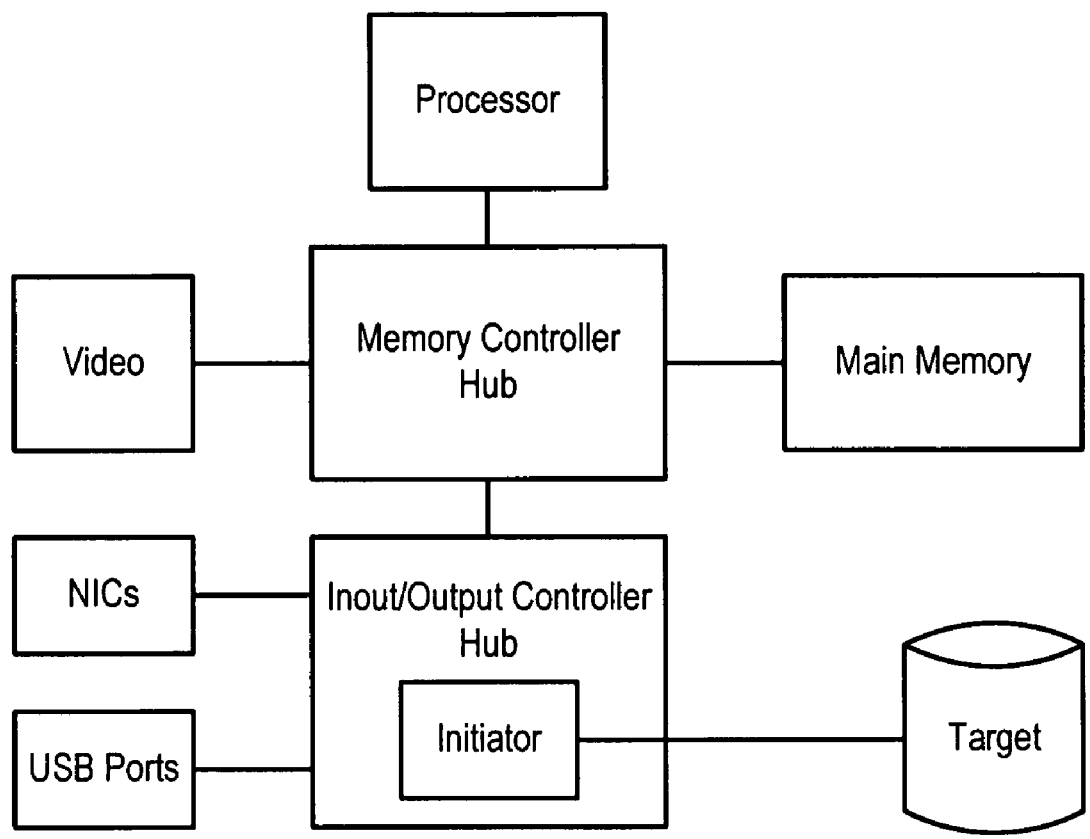
FIG. 3 depicts a computer and a hard drive using the Serial Attached SCSI interface without any expanders.
Figure 4:
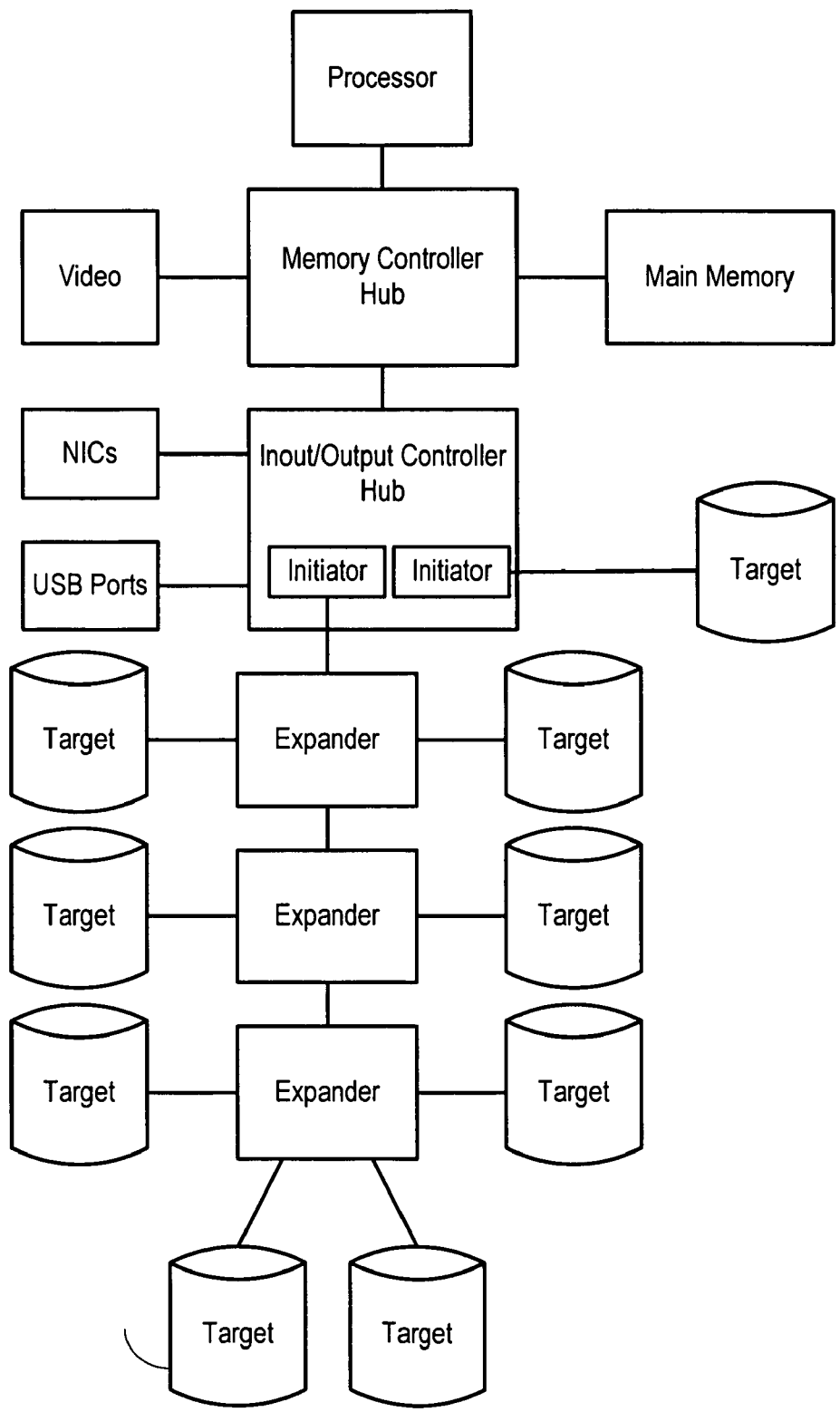
FIG. 4 depicts a computer and hard drives using the Serial Attached SCSI interface with expanders.
Figure 5A:
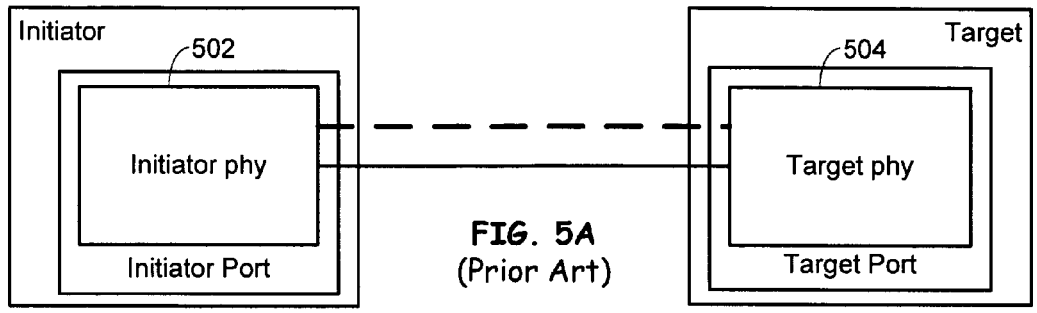
FIG. 5A and 5B depict the initiator phys, expander phys and target phys.
Figure 5B:
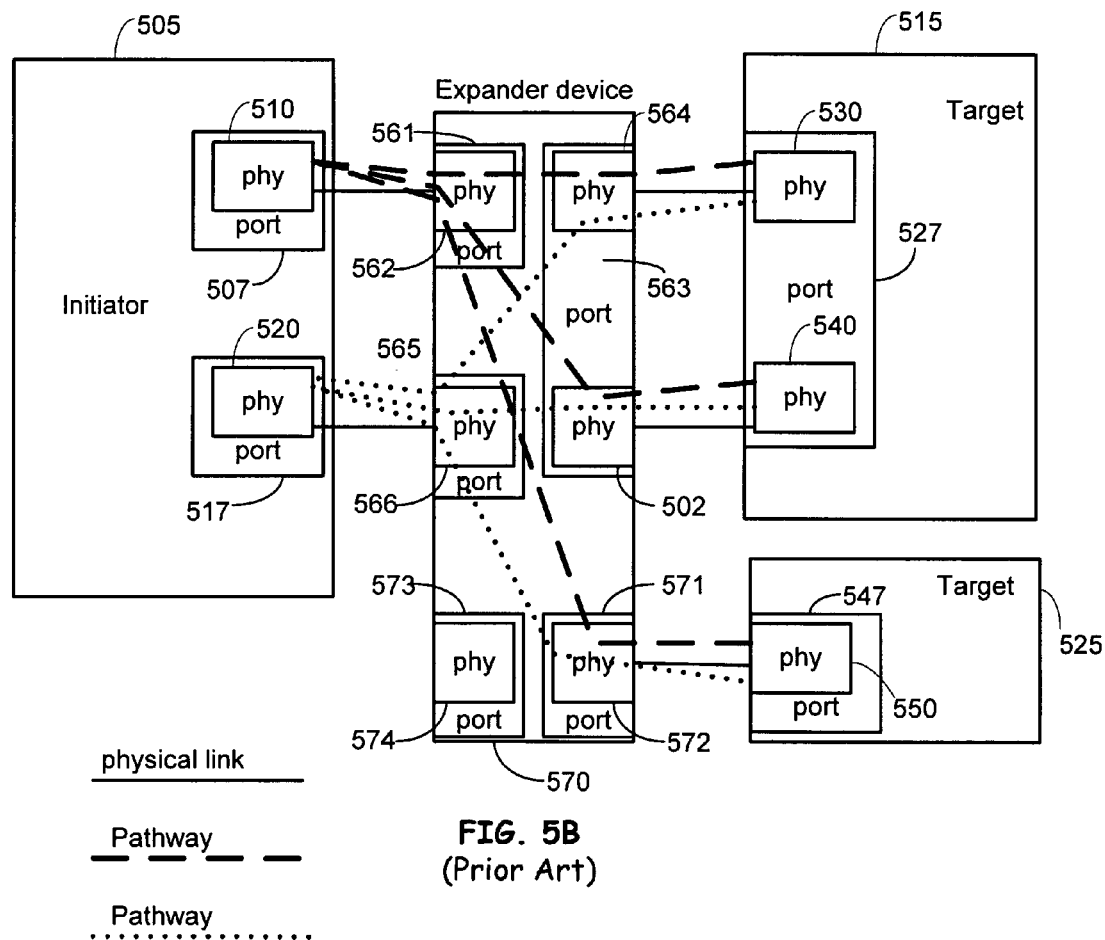
Figure 6:
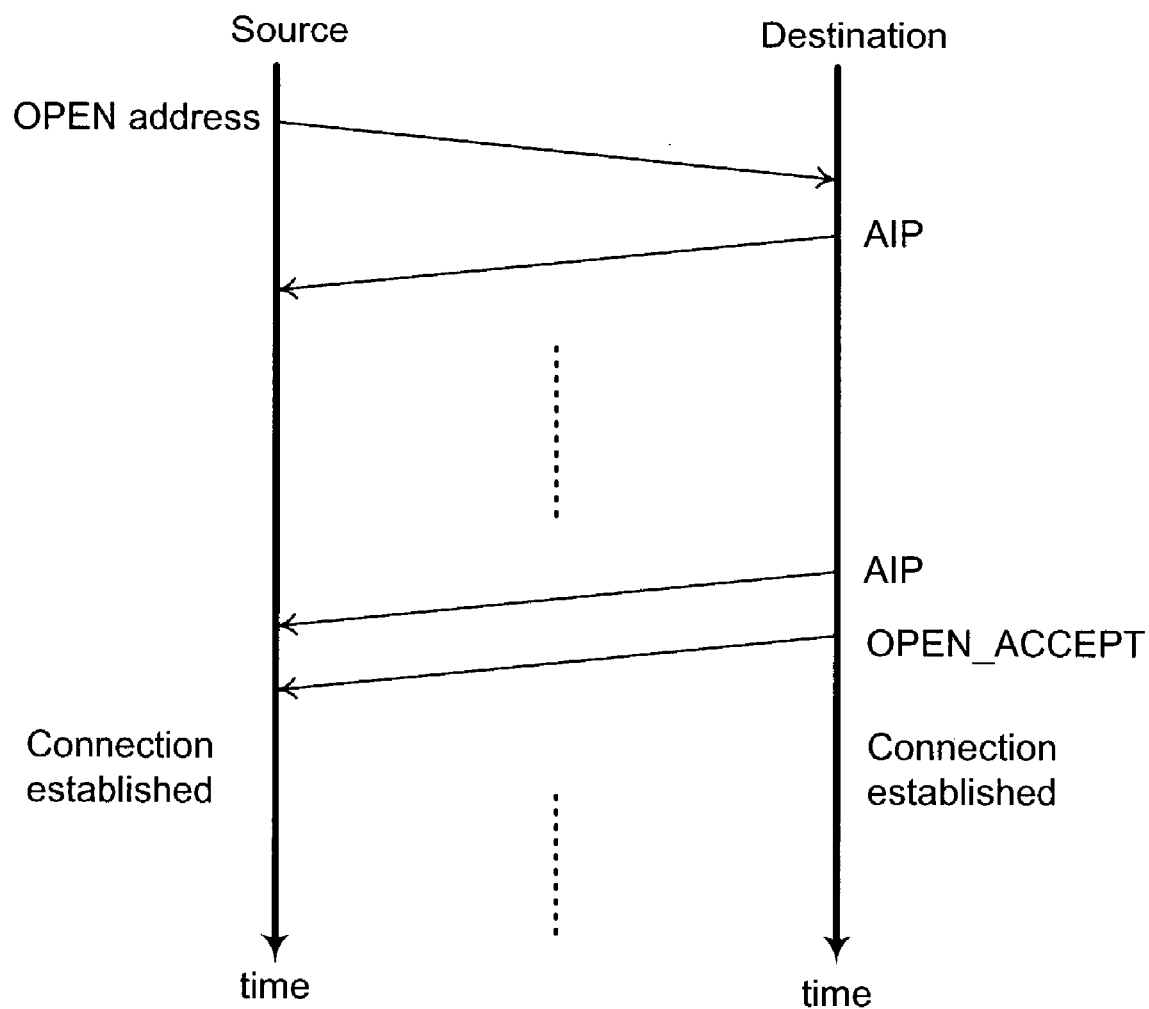
FIG. 6 depicts the OPEN sequence.
Figure 7:
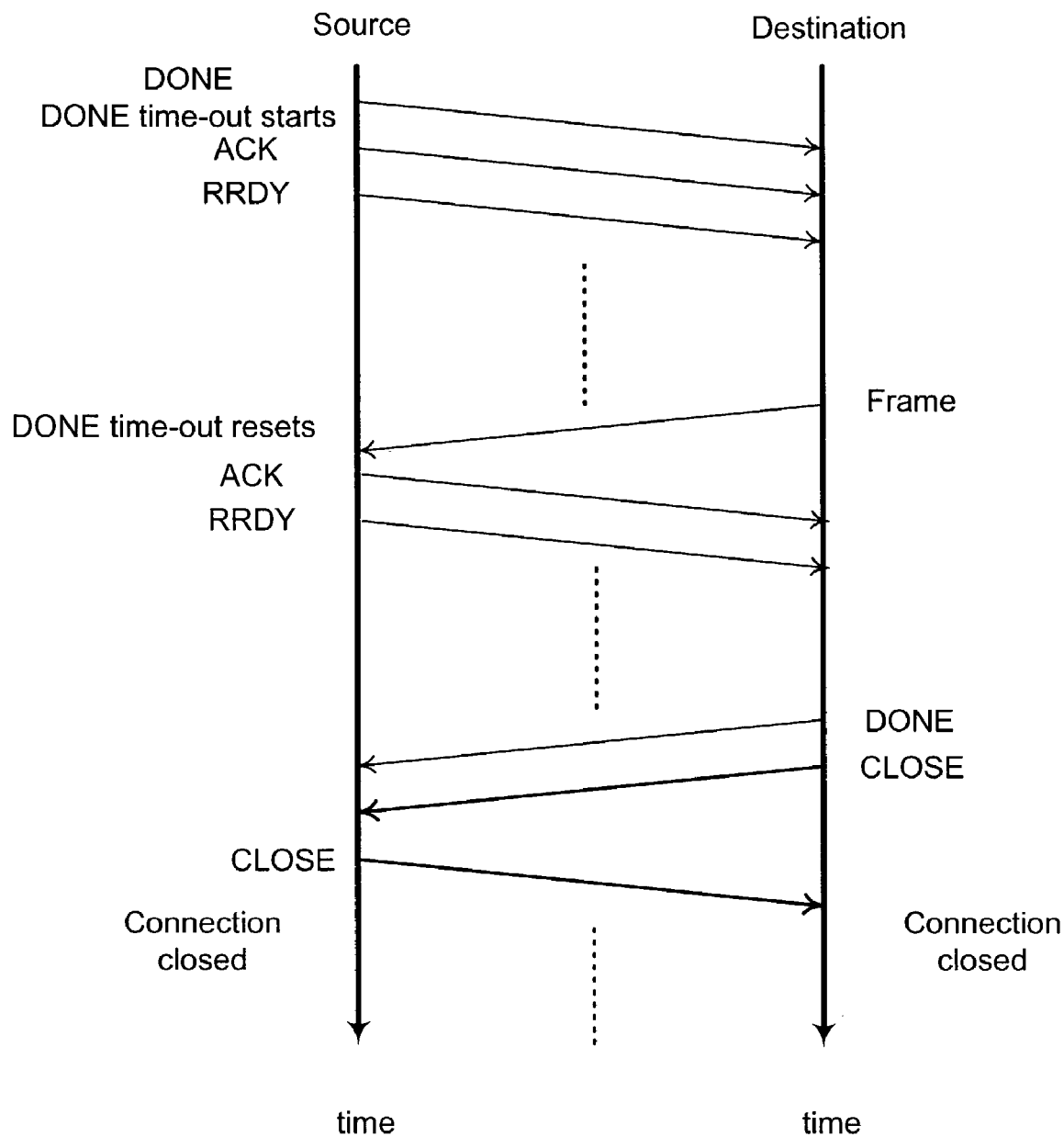
FIG. 7 depicts the close sequence with the DONE primitive.

When the source port has finished a certain task, e.g. has sent all frames, it will transmit DONE (NORMAL) as it does in the prior art, e.g. as shown in FIG. 7. When a destination device has no frames to transmit, it may wait for a vendor-specific period of time, and then transmit DONE (NORMAL). When the source device receives the DONE (NORMAL) from the destination device, the source device can issue the CLOSE primitive to orderly close the connection.

After the source port sends a DONE primitive, it cannot send any frames. It may receive frames and respond with ACK/NAK or RRDY primitives. It may also issue a CLOSE primitive in response to a DONE primitive received before the DONE time-out expires or a BREAK primitive if the DONE time-out expires. The DONE time-out is reset whenever the source port receives a frame from the destination port. Therefore, the destination port can still send frames to the source port indefinitely as long as the destination port sends each frame before the DONE time-out expires.

Besides DONE (NORMAL), there are many types of the DONE primitives indicating additional information about why the connection is being closed, as indicated in Table 1.

DONE (CREDIT TIME-OUT) is a new DONE primitive according to one embodiment of the present invention. DONE (CREDIT TIME-OUT) is transmitted by a source port after a time-out period expires. It indicates that the source port transmitter still has frames to transmit, but the source port has exhausted its credits and did not receive an RRDY primitive granting new frame credit within a time-out period. Once the destination port receives such a DONE primitive, it knows that there are problems with the connection to the source port. It has not sent enough credits back to the source port and it is too late to send any credits. However, the destination port may keep the connection alive indefinitely by transmitting frames within the DONE time-out period of the source port, with the DONE time-out period being reset upon the receipt of each frame. The destination port may close the connection by returning a DONE (normal) within the DONE time-out period. That way, the source port can issue the CLOSE primitive to close the connection orderly, rather than break the connection.

DONE (ACK/NAK TIME-OUT) is another new DONE primitive according to one embodiment of the present invention. Still assuming initiation by the source port, DONE (ACK/NAK TIME-OUT) is transmitted by the source port after the ACK/NAK time-out period expires. It indicates that the source port transmitted a frame but did not receive the corresponding ACK or NAK within the time-out period. In this case, the ACK/NAK count is imbalanced. This indicates that the source port is going to close/break the connection after the DONE time-out expires. DONE (ACK/NAK TIME-OUT) usually indicates that there is a communication problem within the connection. The destination port must transmit a DONE (normal) to close the connection within the time-out period, otherwise, the connection will be broken. The destination may still continue sending frames if it can finish within the time-out period and send a DONE (normal) primitive. Once a DONE (ACK/NAK TIME-OUT) is received by the destination port, it is too late to send an ACK primitive from the destination port. If the connection is so bad that the destination port cannot respond within the DONE time-out period, then the source port will break the connection. This allows the source port to abandon the broken connection and to start the recovery process.

For DONE (normal) and DONE (credit time-out), the DONE time-out clock is preferably reset by the source port when it receives a frame from the destination port, effectively halting the connection closing process. A response to a DONE primitive that can halt the closing process is a keep-alive response. Effectively, a frame is a keep-alive response for DONE (normal) and DONE (credit time-out). For DONE (ACK/NAK time-out), there is nothing that can halt the closing process. The DONE time-out clock will expire at the predetermined time. If a DONE (normal) is received by the source port before the DONE time-out expires, then the source port can send a CLOSE primitive to close the connection. Otherwise, the source port will send the BREAK primitive to break the connection.

Other DONE primitives are also available for various uses when needed. Several DONE primitives with reserved reasons are reserved for future uses.

To facilitate the understanding of the embodiments of the current invention, FIGS. 8-11 depict several time-sequences to close or break a connection. These figures are for illustration purposes and in no way to limit the scope of the invention.

Figure 8:
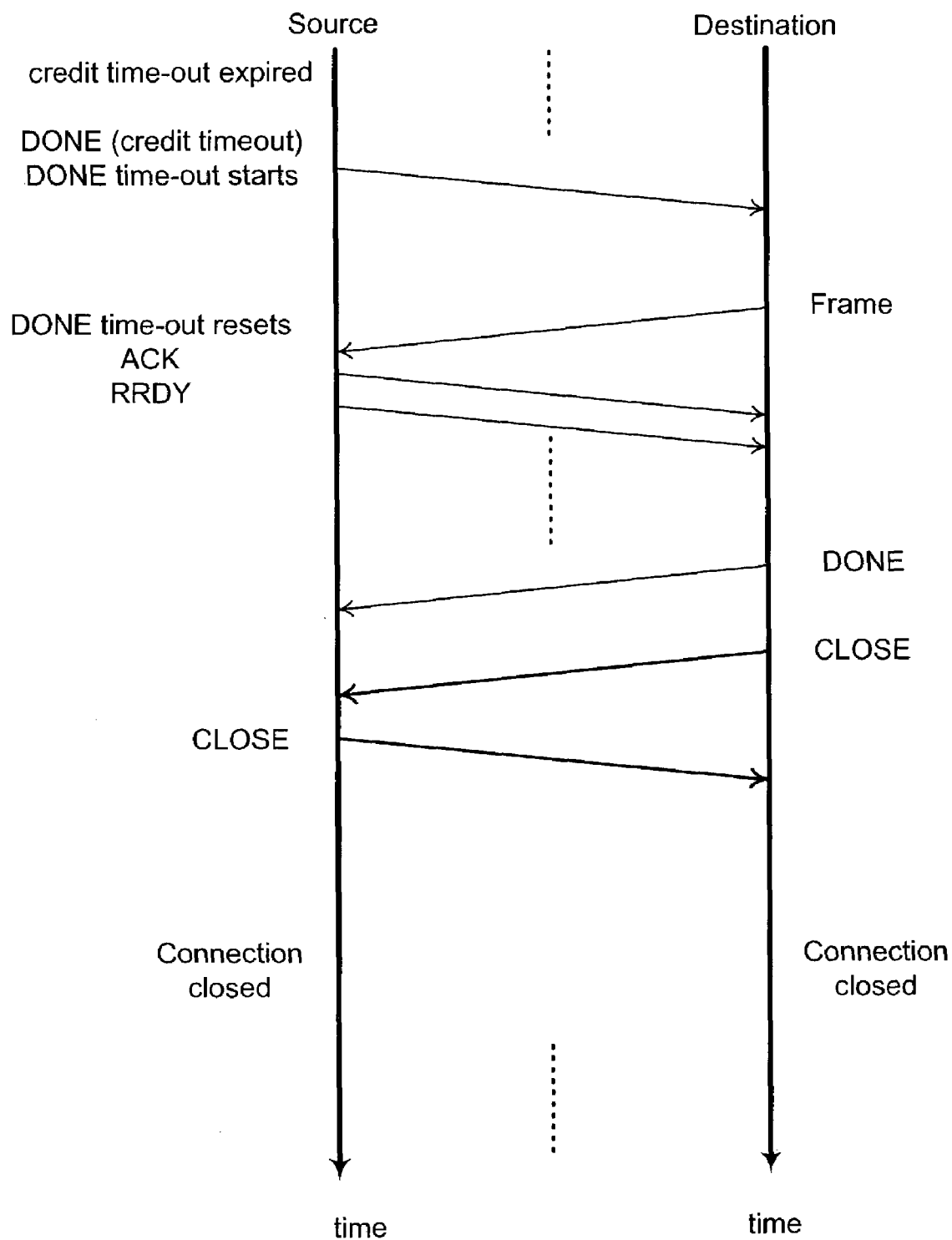
FIG. 8 depicts a time sequence of the DONE (credit timeout) primitive with CLOSE primitive.

In FIG. 8, after the credit time-out expires, the source port sends out a DONE (credit time-out) and starts the DONE time-out timer. This informs the destination port that the source port still has frames to transmit but the source port has run out of credits. The destination port has not returned enough credits back, i.e. sent the RRDY primitives back to the source port. The source port cannot send any more frames. It can still respond with an ACK or RRDY primitives to a frame is sent by the destination port. The DONE time-out is reset by the frame received at the source port. When the destination port finishes sending its frames, it can send a DONE (normal). Once a port sends and receives a DONE primitive, regardless of the sequence, it can send a CLOSE primitive. Therefore, the destination port may send a CLOSE primitive right after sending the DONE primitive. The source port responds with a CLOSE primitive to mutually close the connection. All resources allocated to the connection are released.

Figure 9:
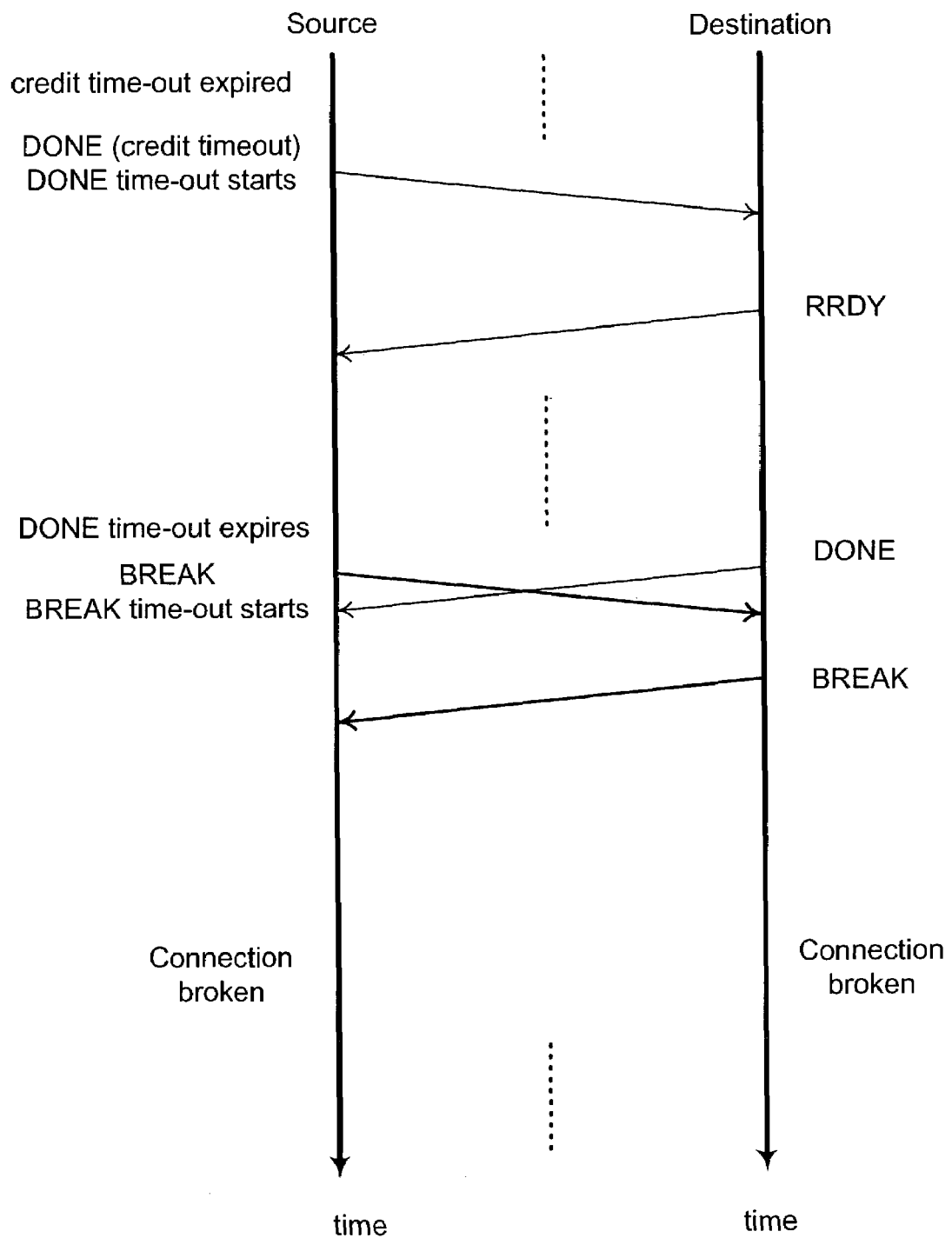
FIG. 9 depicts a time sequence of the DONE (credit timeout) primitive with BREAK primitive.

In FIG. 9, the top section of the time sequence is the similar to FIG. 8, where a credit time-out has expired and the source port is proposing to close the connection by sending the DONE (credit time-out) primitive. The destination port sends a RRDY but it is too late to revive the credit time-out. An RRDY primitive does not reset the DONE time-out. Then the destination port sends a DONE primitive after some other frames. However, in the example, the DONE time-out on the source port expires because the DONE (normal) does not reach the source port in time. The source port sends a BREAK. The destination can do nothing except sending out the BREAK primitive to confirm the break of the connection or do nothing to let the connection be assumed broken.

Figure 10:
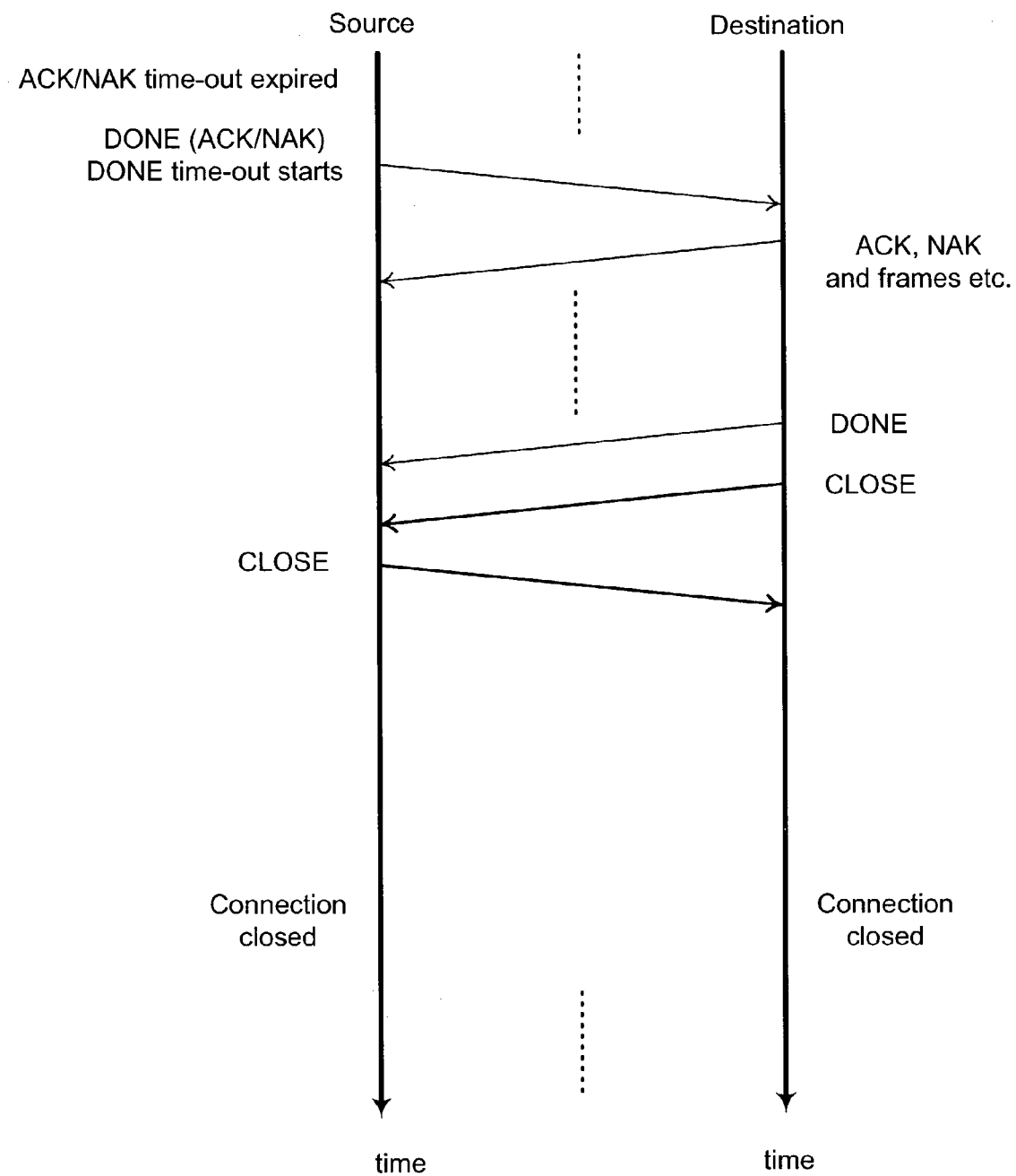
FIG. 10 depicts a time sequence of the DONE (ACK/NAK time-out) primitive and connection closed normally.

Referring to FIG. 10, a time sequence with DONE (ACK/NAK time-out) is depicted. When the ACK/NAK time-out expires, i.e. the source port receives no response from the destination port, the source port sends out a DONE (ACK/NAK time-out). When the destination port receives the DONE (ACK/NAK time-out) primitive, the destination port may realize that this connection is in danger of being broken. It must return a DONE (normal) within the time-out period to close the connection. It may still send frames if it can finish them within the time-out period. Then it sends a DONE to the source port. Thereafter, the source port and destination port exchange CLOSE primitives and close the connection normally.

Figure 11:
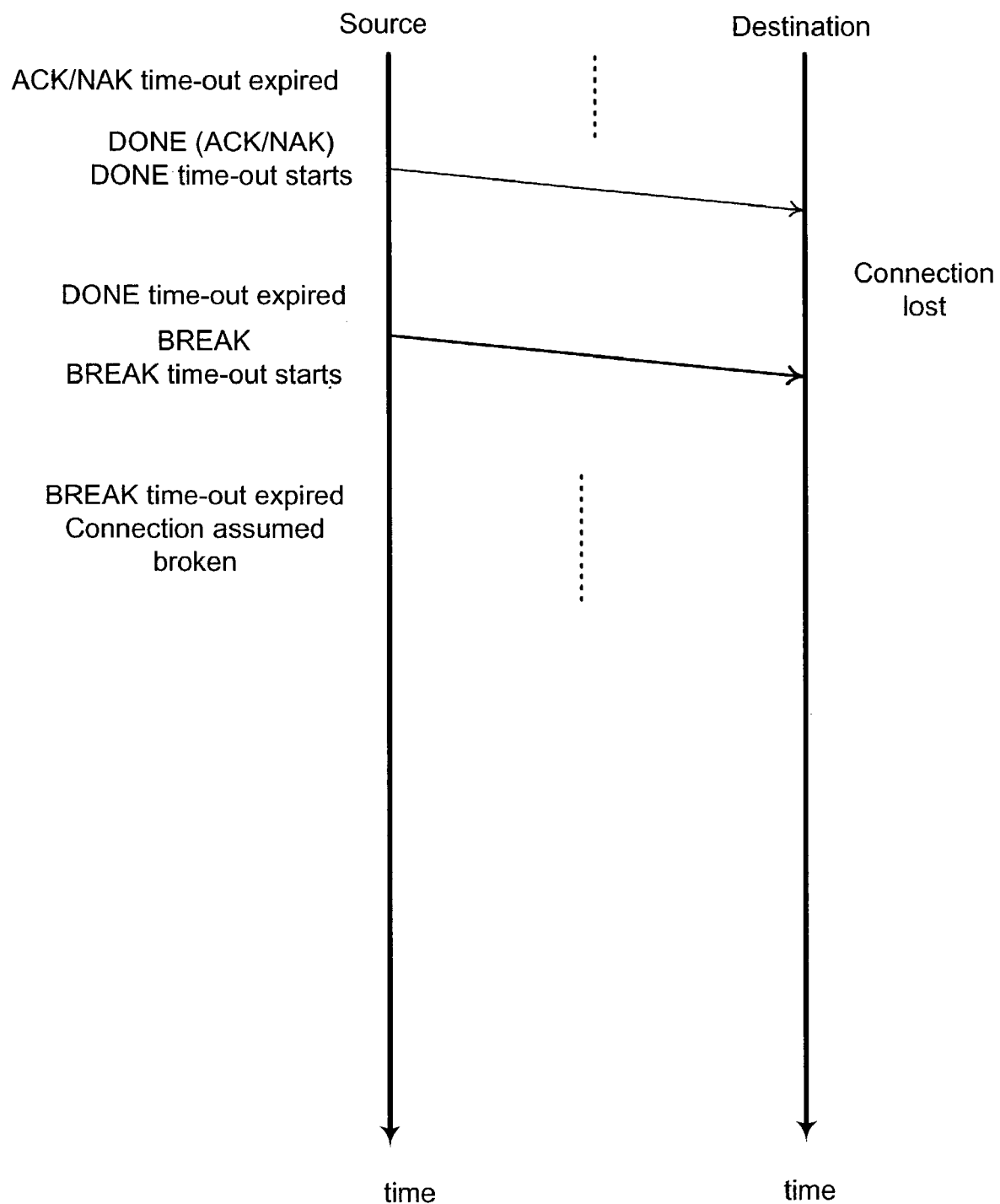
FIG. 11 depicts a time sequence of the DONE (ACK/NAK timeout) primitive and a broken connection.

Referring to FIG. 11, after an ACK/NAK time-out expires, the source port sends out the DONE (ACK/NAK time-out) primitive requesting to close the connection. The connection between the two ports may have already been lost, so there is no response from the destination port. When the DONE time-out expires, the source port sends out the BREAK primitive. Again there is no response. Finally, the source port realizes that the connection must have been lost, and assumes that the connection is broken. After the connection is broken, the source port can start recovery.

Typically, the time-out period is about 1 ms (millisecond). Different time-out periods may be the same for simplicity, or be different for flexibility in different situations.

In the above description and the figures, closure is always started by the source port, which may be an initiator port or a target port. This is for simplicity of discussion purposes only. A closure of a connection may be started by either a source port or a destination port, as understood by any persons skilled in the relevant art.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

The invention claimed is:

1. A method for closing a connection between a first port and a second port, with or without intermediate ports, comprising:
   the first port sending a closing connection request with a reason for closure;
   the first port receiving a response from the second port; and
   the first port halting a closing process if the response is a keep-alive-response, otherwise, the first port proceeding with the closing process.

2. The method in claim 1, further comprising: the first port starting a closing time-out timer when sending the closing connection request.

3. The method in claim 2, wherein the response from the second port is a closing request acknowledgement and wherein the step of the first port proceeding with the closing process includes:
   the first port sending a closing statement; and
   the first port releasing resources allocated to the connection.

4. The method in claim 3, wherein the closing connection request is the DONE (credit timeout) primitive and closing request acknowledgement is a DONE primitive.

5. The method in claim 3, wherein the closing statement is the CLOSE primitive.

6. The method in claim 2, wherein the first port receives no response before the closing time-out timer expires and wherein the step of the first port proceeding with the closing process includes the first port sending a unilateral closing statement in such instance.

7. The method in claim 6, wherein the unilateral closing statement is the BREAK primitive.

8. The method in claim 2, wherein the first port and the second port are ports in compliance with the SAS specification, and wherein the first port and the second port each comprise one or more phys.

9. The method in claim 2, wherein the keep-alive-response is a frame; and the first port halts the closing process by resetting the closing time-out timer.

10. A method for closing a connection between a first port and a second port, with or without intermediate ports, comprising:
    the first port sending a closing connection request with a reason for closure;
    the first port starting a closing time-out timer when sending the closing connection request; and
    the first port sending a closing statement if it receives a closing response from the second port before the closing time-out timer expires, otherwise, the first port sending a breaking statement.

11. The method in claim 10,
    wherein the closing connection request with a reason for closure is the DONE (ACK/NAK) primitive.

12. The method in claim 10:
    wherein the closing response is a DONE primitive;
    wherein the closing statement is the CLOSE primitive; and
    wherein the breaking statement is the BREAK primitive.

13. A method for closing a connection between a first port and a second port, with or without intermediate ports, comprising:
    the second port receiving a closing connection request with a reason for closure;
    the second port processing the closing connection request at a high priority; and
    the second port sending a response.

14. The method in claim 13, wherein the closing connection request with a reason for closure is the DONE (credit time-out) and the response is a frame.

15. The method in claim 13, wherein the closing connection request with a reason for closure is the DONE (ACK/NAK) and the response is a DONE primitive.

16. The method in claim 15, wherein the first port starts a time-out timer upon sending the closing connection request with a reason for closure and wherein the second port sends a frame prior to responding and the response occurs before a time-out occurs in the first port.

17. The method in claim 13, wherein the closing connection request with a reason for closure is the DONE (credit time-out) and the response is a DONE primitive.

18. The method in claim 13, further comprising:
the second port sending a closing statement to close the connection.

19. The method in claim 18, wherein the closing statement is the CLOSE primitive.

20. A method for closing a connection between a first port and a second port, with or without intermediate ports, comprising:
the first port sending a closing connection request with a reason for closure;
the second port receiving the closing connection request with a reason for closure;
the second port processing the closing connection request at a high priority;
the second port sending a response;
the first port receiving the response from the second port; and
the first port halting a closing process and keeping the connection alive if the response is a keep-alive-response, otherwise, the first port proceeding with the closing process.

21. The method in claim 20, further comprising:
the first port starting a closing time-out timer when sending the closing connection request.

22. The method in claim 21, wherein the first port receives no response before the closing time-out timer expires and wherein the step of the first port proceeding with the closing process includes the first port sending a unilateral closing statement.

23. The method in claim 22, wherein the unilateral closing statement is the BREAK primitive.

24. The method in claim 21, wherein the step of the first port proceeding with the closing process includes:
the first port receiving a closing request acknowledgement from the second port;
the first port and the second port exchanging closing statements; and
the first port and the second port releasing resources allocated to the connection.

25. The method in claim 24, wherein the closing connection request is the DONE (credit timeout) primitive and closing request acknowledgement is a DONE primitive.

26. The method in claim 24, wherein the closing statement is the CLOSE primitive.

27. The method in claim 21, wherein the first port and the second port are ports in compliance with the SAS specification, and wherein the first port and the second port each comprise one or more phys.

28. The method in claim 21, wherein the keep-alive-response is a frame and the first port halting the closing process by resetting the closing time-out timer.

29. A port for connecting to a second port over a dedicated connection, comprising:
a phy; and
a circuit coupled to the phy,
wherein the circuit is operable to send a closing connection request with a reason for closure when the phy is coupled to a second phy on the second port and the dedicated connection is established;
to receive a response from the second port; and
to halt a closing process if the response is a keep-alive-response,
otherwise, to proceed with the closing process.

30. The port as in claim 29, wherein the port further includes a time-out timer which starts when the closing connection request is sent.

31. The port as in claim 30, wherein the response from the second port is a closing request acknowledgement and wherein to proceed with the closing process includes:
sending a closing statement; and
releasing resources allocated to the connection.

32. The port as in claim 31, wherein the closing connection request is the DONE (credit timeout) primitive and closing request acknowledgement is a DONE primitive.

33. The port as in claim 31, wherein the closing statement is the CLOSE primitive.

34. The port as in claim 30, wherein the port does not receive response before time-out timer expires and wherein the circuit is further operable to send a unilateral closing statement in such instance.

35. The port as in claim 34, wherein the unilateral closing statement is the BREAK primitive.

36. The port as in claim 30, wherein the keep-alive-response is a frame; and the first port halts the closing process by resetting the closing time-out timer.

37. A port for connecting to a second port over a dedicated connection, comprising:
a phy; and
a circuit coupled to the phy,
wherein the circuit is operable to send a closing connection request with a reason for closure when the phy is coupled to a second phy on the second port and the dedicated connection is established;
wherein the circuit includes a closing time-out timer started when the closing connection request is sent; and
wherein the circuit is operable to send a closing statement if the port receives a closing response from the second port before the closing time-out timer expires, otherwise, the circuit is operable to send a breaking statement.

38. The port in claim 37:
wherein the closing connection request with a reason for closure is the DONE (ACK/NAK) primitive.

39. The port in claim 37:
wherein the closing response is a DONE primitive;
wherein the closing statement is the CLOSE primitive; and
wherein the breaking statement is the BREAK primitive.

40. A port for connecting to a second port over a dedicated connection, comprising:
a phy; and
a circuit coupled to the phy,
wherein the circuit is operable to receive a closing connection request with a reason for closure when the phy is coupled to a second phy on the second port and the dedicated connection is established;
to process the closing connection request from the second port at a high priority; and
to send a response.

41. The port in claim 40, wherein the closing connection request with a reason for closure is the DONE (credit timeout) and the response is a frame.

42. The port in claim 41, wherein the circuit is further operable to send a closing statement to close the connection.

43. The port in claim 42, wherein the closing statement is the CLOSE primitive.

44. The port in claim 40, wherein the closing connection request with a reason for closure is the DONE (ACK/NAK) and the response is a DONE primitive.

45. The port in claim 44, wherein the second port starts a time-out timer upon sending the closing connection request with a reason for closure and wherein the circuit is operable to send a frame prior to responding and the response occurs before the time-out occurs in the second port.

46. The port in claim 40, wherein the closing connection request with a reason for closure is the DONE (credit timeout) and the response is a DONE primitive.

47. A storage system comprising:
an initiator, comprising:
a processor;
a memory module coupled to the processor;
an initiator controller coupled to the processor; and
an initiator phy coupled to the initiator controller;
a target, comprising:
a mass storage device;
a target controller coupled to the storage device; and
a target phy coupled to the target controller; and
at least one expander comprising:
two phys coupled to each other; and
an expander controller coupled to each of the two phys;
wherein the initiator and the target are coupled through any expanders via phys;
wherein a dedicated connection links the initiator and the target; and
wherein the initiator controller and the target controller are each operable:
to send a closing connection request with a reason for closure;
to receive a closing connection request with a reason for closure;
to process a received closing connection request at a high priority;
to send a response to the closing connection request;
to receive a response; and
to halt a closing process if the response is a keep-alive-response, otherwise, to proceed with the closing process to close the connection.

48. The system as in claim 47,
wherein the initiator further includes an initiator time-out timer coupled to the initiator controller;
wherein the target further comprises an target time-out timer coupled to the target controller; and
wherein the time-out timer is started when sending the closing connection request.

49. The system as in claim 48, wherein to proceed with the closing process comprises:
receiving a closing request acknowledgement;
sending a closing statement;
receiving a closing statement; and
releasing resources allocated to the connection.

50. The system as in claim 49, wherein the closing connection request acknowledgement is the DONE (credit timeout) primitive and closing request acknowledgement is a DONE primitive.

51. The system as in claim 49, wherein the closing statement is the CLOSE primitive.

52. The system as in claim 48, wherein the initiator and target controllers are further operable to send a unilateral closing statement if no response is received before their time-out timer expires.

53. The system as in claim 52, wherein the unilateral closing statement is the BREAK primitive.

54. The system as in claim 48, wherein the keep-alive-response is a frame; and the closing process is halted by resetting the closing time-out timer.

55. A storage system comprising:
an initiator, comprising:
a processor;
a memory module coupled to the processor;
an initiator controller coupled to the processor; and
an initiator phy coupled to the initiator controller;
a target, comprising:
a mass storage device;
a target controller coupled to the storage device; and
a target phy coupled to the target controller; and
at least one expander comprising:
two phys coupled to each other; and
an expander controller coupled to each of the two phys;
wherein the initiator and the target are coupled through any expanders via phys;
wherein a dedicated connection links the initiator and the target; and
wherein the initiator controller and the target controller each include a closing time-out timer and are each operable:
to send a closing connection request with a reason for closure;
to start a closing time-out timer when sending the closing connection request;
to receive a closing connection request with a reason for closure;
to process a closing connection request at a high priority;
to send a response to the closing connection request;
to receive a response; and
to send a closing statement if the response is a closing response and is received before the closing time-out timer expires, otherwise, to send a breaking statement.

56. The system in claim 55:
wherein the closing connection request with a reason for closure is the DONE (ACK/NAK) primitive;
wherein the closing response is a DONE primitive;
wherein the closing statement is the CLOSE primitive; and
wherein the breaking statement is the BREAK primitive.

57. The system in claim 56, wherein the initiator controller and the target controller are each further operable to send a frame prior to responding and responding before a time-out occurs.

58. A method for closing a connection between a first port and a second port, with or without intermediate ports, comprising:
the first port sending a closing connection request with a reason for closure;
the first port starting a closing time-out timer when sending the closing connection request;
the second port receiving the closing connection request with a reason for closure;
the second port processing the closing connection request at a high priority;
the second port sending a response; and
the first port sending a closing statement if it receives a closing response before the closing time-out timer expires, otherwise the first port sending a breaking statement.

59. The method in claim 58,
wherein the closing connection request with a reason for closure is the DONE (ACK/NAK) primitive;
wherein the closing response is a DONE primitive;
wherein the closing statement is the CLOSE primitive; and
wherein the breaking statement is the BREAK primitive.

60. The method in claim 58, wherein the second port sends a frame prior to responding and the second port responds before a time-out occurs in the first port.

61. A storage system comprising:
an initiator, comprising:
  a processor;
  a memory module coupled to the processor;
  an initiator controller coupled to the processor; and
  an initiator phy coupled to the initiator controller; and
a target, comprising:
  a mass storage device;
  a target controller coupled to the storage device; and
  a target phy coupled to the target controller;
wherein the initiator phy and the target phy are coupled together;
wherein a dedicated connection links the initiator and the target; and
wherein the initiator controller and the target controller are each operable:
  to send a closing connection request with a reason for closure;
  to receive a closing connection request with a reason for closure;
  to process a received closing connection request at a high priority;
  to send a response to the closing connection request;
  to receive a response; and
  to halt a closing process if the response is a keep-alive-response, otherwise, to proceed with the closing process to close the connection.

62. The system as in claim 61,
wherein the initiator further includes an initiator time-out timer coupled to the initiator controller;
wherein the target further comprises an target time-out timer coupled to the target controller; and
wherein the time-out timer is started when sending the closing connection request.

63. The system as in claim 62, wherein to proceed with the closing process comprises:
  receiving a closing request acknowledgement;
  sending a closing statement;
  receiving a closing statement; and
  releasing resources allocated to the connection.

64. The system as in claim 63, wherein the closing connection request acknowledgement is the DONE (credit timeout) primitive and closing request acknowledgement is a DONE primitive.

65. The system as in claim 63, wherein the closing statement is the CLOSE primitive.

66. The system as in claim 62, wherein the initiator and target controllers are further operable to send a unilateral closing statement if no response is received before their time-out timer expires.

67. The system as in claim 66, wherein the unilateral closing statement is the BREAK primitive.

68. The system as in claim 62, wherein the keep-alive-response is a frame; and the closing process is halted by resetting the closing time-out timer.

69. A storage system comprising:
an initiator, comprising:
  a processor;
  a memory module coupled to the processor;
  an initiator controller coupled to the processor; and
  an initiator phy coupled to the initiator controller; and
a target, comprising:
  a mass storage device;
  a target controller coupled to the storage device; and
  a target phy coupled to the target controller;
wherein the initiator phy and the target phy are coupled together;
wherein a dedicated connection links the initiator and the target; and
wherein the initiator controller and the target controller each include a closing time-out timer and are each operable:
  to send a closing connection request with a reason for closure;
  to start a closing time-out timer when sending the closing connection request;
  to receive a closing connection request with a reason for closure;
  to process a closing connection request at a high priority;
  to send a response to the closing connection request;
  to receive a response; and
  to send a closing statement if the response is a closing response and is received before the closing time-out timer expires, otherwise, to send a breaking statement.

70. The system in claim 69:
wherein the closing connection request with a reason for closure is the DONE (ACK/NAK) primitive;
wherein the closing response is a DONE primitive;
wherein the closing statement is the CLOSE primitive; and
wherein the breaking statement is the BREAK primitive.

71. The system in claim 70, wherein the initiator controller and the target controller are each further operable to send a frame prior to responding and responding before a time-out occurs.

* * * * *